US010267351B2

(12) United States Patent
Uhl

(10) Patent No.: US 10,267,351 B2
(45) Date of Patent: Apr. 23, 2019

(54) FAILURE DETECTION FOR PUSH-PULL RODS HAVING A RESERVE LOAD PATH

(71) Applicant: GMT Gummi-Metall-Technik GmbH, Buehl (DE)

(72) Inventor: Albert Uhl, Buehl (DE)

(73) Assignee: GMT GUMMI-METALL-TECHNIK GMBH, Buehl (DE)

( * ) Notice: Subject to any disclaimer, the term of this patent is extended or adjusted under 35 U.S.C. 154(b) by 255 days.

(21) Appl. No.: 15/119,129

(22) PCT Filed: Feb. 10, 2015

(86) PCT No.: PCT/DE2015/000062
§ 371 (c)(1),
(2) Date: Aug. 16, 2016

(87) PCT Pub. No.: WO2015/124132
PCT Pub. Date: Aug. 27, 2015

(65) Prior Publication Data
US 2017/0058941 A1    Mar. 2, 2017

(30) Foreign Application Priority Data
Feb. 18, 2014   (DE) .................... 20 2014 001 394 U

(51) Int. Cl.
*F16C 7/02*   (2006.01)
*F16C 7/00*   (2006.01)

(52) U.S. Cl.
CPC .................. *F16C 7/02* (2013.01); *F16C 7/00* (2013.01); *F16C 7/026* (2013.01); *F16C 2204/42* (2013.01); *F16C 2326/43* (2013.01)

(58) Field of Classification Search
CPC .... F16C 7/06; F16C 7/08; F16C 7/026; F16C 7/023; F16C 7/02; F16C 7/00; F16C 2326/43; F16B 7/182; Y10T 74/2144; Y10T 74/2148; Y10T 74/2149; Y10T 74/2151; Y10T 74/2152; Y10T 74/2153;
(Continued)

(56) References Cited

U.S. PATENT DOCUMENTS

| 3,526,951 | A |   | 9/1970 | Witsenhausen-Adelmann |
| 4,050,827 | A | * | 9/1977 | Jonda ...................... B64C 11/26 24/122.6 |
| 4,481,902 | A |   | 11/1984 | Meyer et al. |

(Continued)

FOREIGN PATENT DOCUMENTS

| DE | 3111698 A1 | 10/1982 |
| DE | 202004016321 U1 | 3/2005 |

(Continued)

*Primary Examiner* — Daniel D Yabut
(74) *Attorney, Agent, or Firm* — Leydig, Voit & Mayer, Ltd.

(57) ABSTRACT

A fail-safe push-pull rod has two load paths that are separated from each other, of which always only one takes up the load transmission and which automatically detects possible damage to or functional failure of the first load path so that in such a case then the second load path takes over the load transmission, whereby the functional change from the first to the second load path can be determined during the routine maintenance inspection by an inspection hole irreversibly showing the damage or the failure of the first load path.

4 Claims, 4 Drawing Sheets

(58) Field of Classification Search
CPC ............ Y10T 74/2159; Y10T 74/2162; Y10T 74/2163
See application file for complete search history.

(56) References Cited

U.S. PATENT DOCUMENTS

| | | | | |
|---|---|---|---|---|
| 5,203,522 | A * | 4/1993 | White | B64C 27/58 138/110 |
| 8,672,574 | B2 * | 3/2014 | Cavallere | B29C 37/0085 403/79 |
| 2008/0115622 | A1 | 5/2008 | Uhl et al. | |
| 2009/0116898 | A1 * | 5/2009 | Wanthal | B64C 1/06 403/179 |
| 2011/0210229 | A1 * | 9/2011 | Bonnet | F16C 7/04 248/557 |
| 2012/0132493 | A1 * | 5/2012 | Bonnet | B64D 27/26 188/322.5 |
| 2013/0187015 | A1 * | 7/2013 | Quintana Rio | B32B 37/0053 248/200 |

FOREIGN PATENT DOCUMENTS

| | | | | |
|---|---|---|---|---|
| DE | 102012018554 | B3 * | 2/2014 | ............ B60G 7/001 |
| EP | 2607229 | A2 | 6/2013 | |
| FR | 2599793 | A1 * | 12/1987 | ............ B64C 13/30 |
| FR | 2965867 | A1 * | 4/2012 | ............ B64C 1/06 |
| GB | 1485078 | A * | 9/1977 | ............ B64C 11/26 |

* cited by examiner

FAILURE DETECTION FOR PUSH-PULL RODS HAVING A RESERVE LOAD PATH

CROSS-REFERENCE TO RELATED APPLICATIONS

This application is a U.S. national stage application under 35 U.S.C. § 371 of International Application No. PCT/DE2015/000062, filed on Feb. 10, 2015, and claims benefit to German Patent Application No. DE 20 2014 001 394.2, filed on Feb. 18, 2014. The International Application was published in German on Aug. 27, 2015, as WO 2015/124132 A1 under PCT Article 21(2).

FIELD

The present application relates to push-pull rods.

BACKGROUND

In aircraft construction, components are required for a wide range of applications in safety-relevant areas, especially in the wings, which are fault-free and fail-safe or, in the event of damage, have replacement devices which, automatically recognizing the failure of the damaged part of the component, will automatically and safely replace it, i.e. the function of which must be designed according to the "fail-safe" principle. In this context, "fail-safe" means that the component in question contains at least two equivalent systems which can fulfill the specified task of the component, whereby only one of the two systems may ever come into play. If the first system fails, its function must be automatically taken over by the second system on an equivalent basis. It is particularly important here that the failure of the first system can be automatically detected and repaired by the component.

These requirements apply in particular for the push-pull rods which are frequently used in aircraft construction and which are subject to particular stress because of the strong and frequently changing loads, so that total failures as a result of material fatigue or overloading must be excluded.

At the moment, these requirements are met by the fact that, with frequent maintenance intervals, as a precaution after a defined period of use, the push-pull rods are routinely replaced or removed, disassembled, tested, re-assembled and re-installed which, however, naturally involves considerable effort and cost.

The push-pull rods that are common in particular in aircraft construction are available in various versions, such as those described, for example, in DE 202004016321. As a rule, these tubular single-wall bodies are made from light alloy, titanium or carbon-fiber reinforced plastic, provided at each end with a single-layer yoke or eye made from light alloy.

SUMMARY

An aspect of the invention provides a double-wall push-pull rod made from light alloy, titanium, or carbon fiber-reinforced plastic, comprising: a first layer, forming a first load path, located in yokes of an inside of the push-pull rod and on an outside of a tubular body; and a second layer, forming a second load path, located on an outside of the yokes and on an inside of the tubular body, wherein the second layer separates, in a transition area between the tubular body and the yokes, the first layer of the first load path on the inside of the yokes from the first layer of the first load path on the outside of the tubular body, wherein, on both sides diagonally, the yokes and the tubular body of the push-pull rod include a first hole and a second hole through the first and second layers, wherein at least one bolt, configured to transmit load, leads through the holes, wherein the first hole has a 0.5 to 1 mm smaller diameter than the second hole, and wherein the bolt in an original stage has only force-fitting contact with the first hole.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
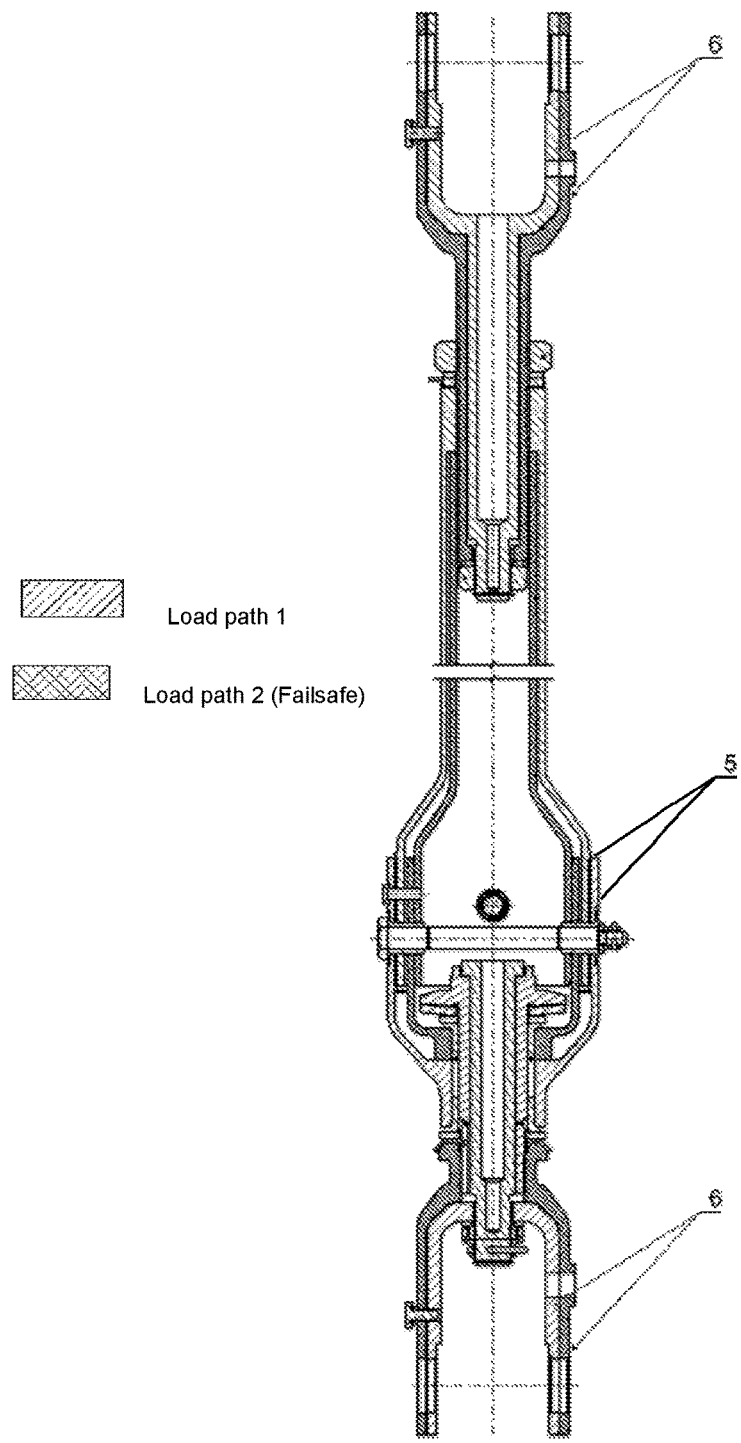
FIG. 1 shows a complete push-pull rod.

An aspect of the invention was therefore to provide a fault-free and fail-safe push-pull rod with an initially non-effective back-up system which automatically detects damage or function failures and automatically repairs them on the one hand and on the other hand displays the assumption of function by the back-up system clearly and easily recognizably so that during routine maintenance inspections it can be checked for function with little expenditure of time and money and replaced if necessary. This task was solved as follows.

Because, according to the logic of the fail-safe principle this can only, by its very nature, be achieved if in each case only one defined load path takes up the loads, the push-pull rod must be designed in such a way that it has two load paths working separately from each other which are placed in relation to each other in such a way that only one load path takes over the load transmission in each case and that the second load path only assumes this task if the first load path fails. The term "load path" under the terms of the invention is understood to be the totality of the separate parts of the push-pull rod which are intended to take the forces working on it. These are the tubular body and the yoke ends affixed on both sides of the body.

An aspect of the invention, i.e. on the one hand to ensure failure safety by automatic detection of damage and automatic repair thereof and on the other hand to make the failure of the first system detectable externally is achieved by the fact that the tubular body and both yokes are given a double-wall (double-layer) construction. Both walls (layers) can be made from the same usual materials such as light alloy, titanium or carbon-fiber reinforced plastic. The layout of the two walls or two layers must be such that the layer forming the load path 1 is positioned in the yoke inside but in the tubular body outside, whereas for the layer forming load path 2 (component 2), it is exactly the reverse. The layer in the yoke outside forming load path 2 separates, in the transition area between the tube and yoke, the layer of load path 1 (component 1) in the yoke inside from the layer of load path 1 (component 1) in the tube outside. This layout has been chosen in this way because by choosing the inside of the yoke for load path 1, this can easily be detected in the event of failure. The same applies for the choice of the outside of the tubular body for load path 1.

To guarantee that only one load path is ever used, the connection of the load transmission must be carried out as follows. In both yokes and in the tubular body of the push-pull rod on both sides diagonally a hole D1 (7) and D2 (8) is made in each case through the load paths 1 and 2 (components 1 and 2) through which on both sides a bolt 9 passes which serves to transmit load and the thickness of which depends on the likely load. The hole 7 is made with a slightly smaller diameter (approx. 0.5-1 mm) than hole 8 so that the forces arising are transmitted firstly only via hole 7 with the smaller diameter through the force-fitting contact to load path 1 (component 1). This structure is absolutely essential since only in this way is the detection of any later failure of the first load path (component 1) possible, with the (back-up) load path 2 (component 2) initially not being subjected to any load.

After the automatic detection of the failure of load path 1 (component 1) as a result of damage, the deployment of load path 2 (component 2) is carried out by the system automatically. Through the failure of the load take-up by load path 1 (component 1), the application of the force F on hole 7 means that component 1 shifts in relation to component 2. The movement is ended as soon as the diameter of hole 7 has reached the diameter of hole 8 with the result that now only component 2 i.e. load path 2 takes up the force through the force-fitting contact with hole 8.

A further important part of the invention is now that, in the regular maintenance inspections, the failure of the component or load path 1 can also be detected by the maintenance engineer, so that the replacement then required can be carried out. This is done in a surprisingly simple way by means of inspection hole 3 with a diameter of approx. 4-6 mm and using the test mandrel 4, which is necessarily part of the maintenance engineer's tool kit. Through the displacement of component 1 in relation to component 2, the application of force F deforms inspection hole 3 such that the test mandrel 4, which fits the inspection hole precisely in the undamaged condition, can no longer be inserted by the maintenance engineer into the inspection hole 3 of components 1 and 2 because of the irreversible deformation.

The precondition for this is that the inspection hole 3 is made as a sleeve with a very small wall thickness, Furthermore, this must consist of a very ductile material (such as grade 1 titanium or austenitic stainless steel) with a low strength. This thus ensures that even under a low force application F a permanent deformation of inspection hole 3 occurs which can be detected from outside by a test device.

In this way, the failure of load path 1 can be clearly detected from outside during maintenance and the replacement of the push-pull rods because of the failure of load path 1 can be arranged.

An aspect of the invention is explained in the following in more detail using a preferred embodiment.

FIG. 1 shows a complete push-pull rod, consisting of the tubular body 5 and the yokes 6, these in turn consisting of the components 1 and 2, each forming load path 1 and load path 2 respectively. For easier recognition, the components of load path 1 are diagonally hatched in the yoke and tubular body, and those of load path 2 are cross-hatched.

Figure 2:
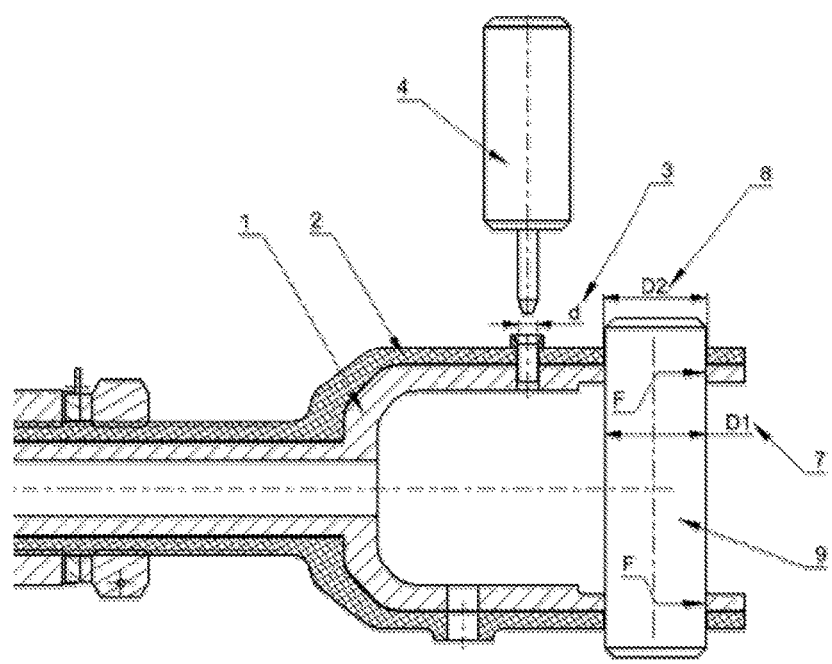
FIG. 2 shows a yoke with a hole D1 and a hole D2 together with a load-transmitting bolt.

FIG. 2 shows yoke 6 with hole D1 (7) and hole D2 (8) together with the load-transmitting bolt 9, which is connected with hole D1 (7) preferably via a force-fitting clearance fit. Here, the hole D1 (7) is slightly smaller than hole D2 (8). In addition, FIG. 2 shows inspection hole 3, which serves to show that component 1 is damaged and thus the failure of load path 1.

Figure 3:
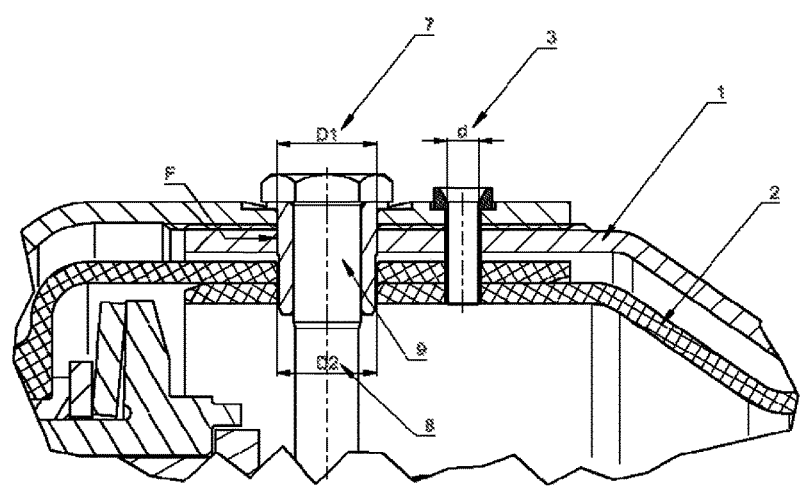
FIG. 3 shows the structure of a tubular body together with a hole D1.

FIG. 3 shows the structure of tubular body 5, together with hole D1 (7) which also has a slightly smaller diameter than hole D2 (8), however with the proviso that now component 1 (load path 1) is outside and component 2 (load path 2) is inside. In addition, FIG. 3 shows inspection hole 3, which serves to show that component 1 is damaged and thus the failure of load path 1.

Figure 4:
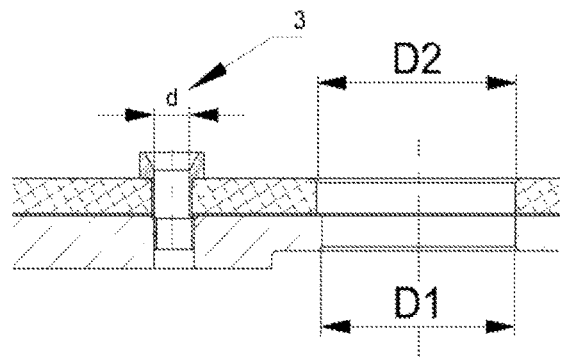
FIG. 4 shows an inspection hole in a damaged state.

FIG. 4 shows inspection hole 3 in the damaged state. Here, because of the failure of load path 1, hole D1 is pushed over to hole D2. This causes the permanent deformation of inspection hole 3.

Figure 5:
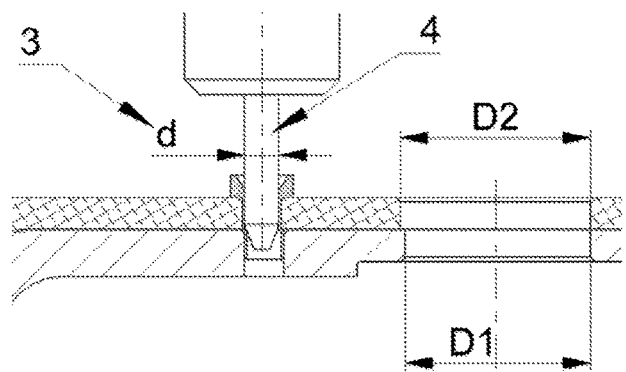
FIG. 5 shows an inspection hole in a damaged state together with a test mandrel during inspection.

FIG. 5 shows inspection hole 3 in the damaged state together with the test mandrel 4 during the inspection. It can now be seen here that the test mandrel 4 can no longer be inserted into inspection hole 3. The failure of load path 1 is thus clearly detected.

Figure 6:
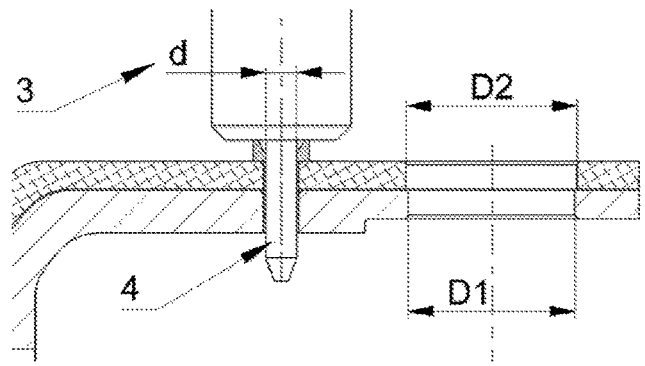
FIG. 6 shows an inspection hole in an undamaged state.

FIG. 6 shows inspection hole 3 in the undamaged state. Here, the test mandrel 4 can be inserted into inspection hole 3 as far as it will go. This ensures that load path 1 has not been damaged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LEGEND

1 Component 1 (load path 1)
2 Component 2 (load path 2)
3 Inspection hole
4 Test mandrel
5 Tubular body
6 Yoke
7 Hole D1

8 Hole D2
9 Bolt of hole D1/D2

The invention claimed is:

1. A double-wall push-pull rod made from alloy, titanium, or carbon fiber-reinforced plastic, comprising:
   a first layer, forming a first load path, located in yokes of an inside of the push-pull rod and on an outside of a tubular body; and
   a second layer, forming a second load path, located on an outside of the yokes and on an inside of the tubular body,
   wherein the second layer separates, in a transition area between the tubular body and the yokes, the first layer of the first load path on the inside of the yokes from the first layer of the first load path on the outside of the tubular body,
   wherein, on both sides, the yokes and the tubular body of the push-pull rod include a first hole and a second hole through the first and second layers,
   wherein at least one bolt, configured to transmit load, leads through the holes,
   wherein the first hole has a 0.5 to 1 mm smaller diameter than the second hole, and
   wherein the bolt in an original stage has only force-fitting contact with the first hole,
   further comprising, alongside the first and second holes in the tubular body and in the yokes of the push-pull rod: an inspection hole, disposed through the first and second layers as a sleeve with a wall thickness comprised of a ductile material, wherein upon an application of a predetermined force, the sleeve is irreversibly deformed such that a precisely fitting test mandrel can no longer be inserted into the inspection hole.

2. The push-pull rod of claim 1, wherein the inspection hole has a diameter in a range of from 4 to 6 mm.

3. The push-pull rod of claim 1, wherein the sleeve comprises grade 1 titanium.

4. The push-pull rod of claim 1, wherein the sleeve comprises austenitic stainless steel.

* * * * *